United States Patent [19]

Best

[11] Patent Number: 4,616,149
[45] Date of Patent: Oct. 7, 1986

[54] ARRANGEMENT FOR JOINING THE CABLE ENDS OF A STATOR WINDING OF ELECTRIC MOTORS BY MEANS OF A CONNECTOR

[75] Inventor: Dieter Best, Ingelfingen, Fed. Rep. of Germany

[73] Assignee: ebm Elektrobau Mulfingen GmbH & Co., Mulfingen, Fed. Rep. of Germany

[21] Appl. No.: 646,950

[22] Filed: Sep. 4, 1984

[30] Foreign Application Priority Data

Sep. 28, 1983 [DE] Fed. Rep. of Germany ....... 3335035

[51] Int. Cl.<sup>4</sup> ........................................... H02K 11/00
[52] U.S. Cl. ..................................... 310/71; 310/67 R
[58] Field of Search ................. 310/68 R, 71, 72, 260, 310/270

[56] References Cited

U.S. PATENT DOCUMENTS

| 2,253,191 | 8/1941 | Morrill | 310/71 X |
| 3,515,917 | 6/1970 | Kolb | 310/71 |
| 3,772,544 | 11/1973 | Wrobel | 310/67 X |
| 3,780,323 | 12/1973 | Swain | 310/71 X |
| 4,030,791 | 6/1977 | Sheesley | 310/71 X |

Primary Examiner—Donovan F. Duggan
Attorney, Agent, or Firm—Jones & Askew

[57] ABSTRACT

Arrangement for joining the cable ends (7) of a stator winding of electric motors, in particular external rotor motors (5), with a connecting lead, using electrical connecting elements (6) and an insulating disc (1) arranged at one end of the stator, which disc has an opening passing from the front insulating shaft (9) of the stator plates (13) of the electric motor and serves to cover as well as insulate the winding head (4) of the stator winding, wherein the connecting elements (6) are formed as connectors (15) and in each case a connector part is held in a frictional or positive locking manner on the insulating disc (1).

18 Claims, 9 Drawing Figures

ARRANGEMENT FOR JOINING THE CABLE ENDS OF A STATOR WINDING OF ELECTRIC MOTORS BY MEANS OF A CONNECTOR

The invention relates to an arrangement for joining the cable ends of a stator winding of electric motors, in particular external rotor motors, with a connecting lead using electrical connecting elements and an insulating disc arranged at one end of the stator, which disc has an opening extending from the front insulating shaft of the stator plates of the electric motor and serves to cover as well as insulate the coil winding head of the stator winding.

An arrangement of the type mentioned at the beginning is known from DE-OS No. 24 15 839, in which the winding ends of the stator winding and the stranded ends of the connecting lead are joined to one another by means of clamping shoes. The clamping shoes are plugged into pocket-shaped hollow spaces, open at the front, of insulating material elements arranged on radially running, stellate web ends of an end disc. A cover disc having retaining ribs at the points opposite the hollow spaces can be locked with the end disc, the said ribs pressing on the section of the connecting strand joined to the relevant clamping shoe and bent so as to form an angle, in order to fix the said cable shoe. The disadvantage of such an arrangement however is the fact that the winding ends of the stator winding are squeezed tight by means of the clamping shoe to the strand ends of the connecting lead so that this electrical connection cannot easily be released. Indeed, the electrical connection can only be broken by destroying the clamp connection. The electrical connection may have to be released for example when dismantling the motor or making a new connection to the electric motor. In addition, it is a disadvantage of the known arrangement that the individual clamp connections are arranged on a circle, at a uniform angular spacing from one another, around the shaft of the motor. In this way the connecting lead is not led to a central connecting region, but instead runs to different connecting points distributed over the whole winding head region of the motor, which can lead to the formation of loops that may possibly come into contact with the rotating parts of the motor, thereby damaging the insulation. Furthermore, when locking the end disc and cover disc all the clamping shoes have to be placed in the pocket-shaped hollow spaces, which undoubtedly considerably hinders the installation work since an unintentional pulling on one of the connecting strands—which is virtually unavoidable in installation work—causes the corresponding clamping shoe to slide out of the pocket-shaped allow space.

The object of the invention is to provide an arrangement of the type mentioned at the beginning in which the winding ends of the stator winding can be connected to, and released from, the connecting lead in a simple manner, and the connecting elements are prevented rom unintentionally slipping out during the installation work. The object of the invention is also to be able to effect the connection of the lead ends of the stator winding within a central connecting region of the electric motor.

This object is achieved in accordance with the invention if the connecting elements are formed as connectors and in each case a connector part is held on the insulating disc in a frictional and/or positive locking manner. By means of the connectors it is thus possible to connect in a simple way the connecting lead to the winding ends of the stator winding and to break this connection. In this connection, in each case a part of the connector—this may be a plug or a socket—is held on the insulating disc in a frictional and/or positive locking manner so that an unintentional displacement or an undesirable change in position of the connecting elements, for example during installation or connecting work, is impossible.

According to a development of the invention it is provided that the connecting elements are retained in the locking position on the insulating disc. In particular, the arrangement in this connection may be such that the connecting elements are inserted into receiving pockets in the insulating disc and are retained by means of catch means. On account of the locking position of the connecting elements on the insulating disc an immovable positional fixing of the connecting elements is ensured and a simple and quick installation is also guaranteed.

The connecting elements are preferably connectors, in particular flat connectors, formed from a stamped-out sheet metal part, wherein the catch means are formed as catch tongues stamped out from the sheet metal part and bent so as to form an angle, which engage in corresponding recesses in the receiving pockets. In order to retain a connecting element it is therefore only necessary to insert the latter into a receiving pocket until the spring-mounted catch tongue snaps into the recess provided therefor. This catch position can be released again by pressing the catch tongue, which is externally accessible via the recess, downwardly, so that a simple replacement of connecting elements is possible.

It is furthermore provided that each flat connector consists essentially of a rectangular base part with two side edges as well as with a head edge and a foot edge, that a connecting lug for a corresponding jack or socket of the connecting lead is connected in one piece to the foot edge, and that the catch tongue is formed in the region of the base part and has a free end pointing in the direction opposite to the insertion direction of the flat connector into the receiving pocket. The rectangular base part thus serves to retain the flat connector on the insulating disc; it is furthermore provided that the corresponding winding end of the stator winding of the electric motor is secured thereon by soldering or welding. The arrangement of the catch tongue is such that its free end rests against the corresponding wall of the recess of the receiving pocket if a force acts on the flat connector opposite to the insertion direction of the flat connector in the receiving pocket. In this way removal of the flat connector from the receiving pocket is prevented.

For a particularly reliable fixing of the flat connector, two catch tongues are preferably provided on the flat connector. According to a development of the invention one of the catch tongues is arranged in the vicinity of each side edge of the base part.

It is also advantageous if two connecting lugs aligned parallel to one another are joined integrally to the foot edge of the base part. This gives the possibility of being able to connect further electrical leads to the flat connector. In the simplest case this could be the connection of a signal lamp.

According to a further development of the invention a connecting lug for the stator winding is stamped out from the base part and is bent upwardly in such a way that it projects beyond the remaining surface of the base part. In this way the connecting lug can run substantially parallel to the remaining surface of the base part surrounding the connecting lug. The connecting lug forms an easily accessible region of the base part, so that the work involved in connecting the winding ends of the stator winding can easily be carried out.

The arrangement is furthermore planned so that the insulating disc has a cover region for the winding head of the electric motor and a receiving region for retaining the flat connectors. In this way all flat connectors are arranged centrally in the receiving region, so that the connecting lead only has to be led to this region and the connection takes place centrally here. According to one embodiment of the invention two flat connectors are arranged in parallel adjacent receiving pockets in the receiving region of the insulating disc.

The invention furthermore provides that each receiving pocket is formed from a section of the insulating disc as well as from wall webs arranged vertically to the insulating disc and bordering the side edges and the head edge of the base part of the flat connector, and from retaining walls which partially overlap the flat connector and run parallel to the insulating disc, and join onto the wall webs. The flat connector is thus arranged between the afore-mentioned section of the insulating disc and the retaining walls. The two wall webs running parallel to the side edges of the base part of the flat connector serve as a lateral guide for this positioning. The wall web bordering the head edge of the base part limits the insertion depth of the flat connector in the receiving pocket. It is provided that the retaining walls overlap the flat connectors at least in the region of the catch tongues and contain the recesses for the said catch tongues. In this way the retaining walls serve a double function, namely on the one hand to form a pocket wall and on the other hand to accommodate the catch tongues of the flat connectors.

Clamping webs are advantageously formed in the interior of the receiving pocket both on the insulating disc as well as on the inner surfaces of the retaining walls, against which webs the flat connector lies in such a way that it is arranged centrally and spaced from the insulating disc and the retaining walls in the receiving pocket. These spacings are necessary if the connecting lugs of the flat connector are partly or completely overlapped by the insulating disc and/or the retaining walls; the space formed by the gap then serves to accommodate the corresponding jack of the connecting lead. Furthermore, the arrangement may be such that the clamping webs run in the plug-in direction of the connecting lugs and have at the entrance of each receiving pocket in each case a bevelled surface forming a locating socket for the flat connectors. The work involved in inserting the flat connectors into the receiving pockets is thereby facilitated.

According to another development of the invention it is provided that one cable end of the stator winding of the electric motor is joined to the connecting lead under series connection of a temperature monitor by means of the connectors retained on the insulating disc. In this case too use is made of the advantages, achievable through the invention, of the connector parts held in a frictional or positive locking manner. In this connection it is convenient if the insulating disc has a unilaterally open accommodating recess bordering its edge for the lateral plugging-in of the temperature monitor. The temperature monitor is thus held on the insulating disc by simple lateral insertion into the accommodating recess. It is provided that the accommodating recess is formed in the cover region of the insulating disc near to the receiving region for the flat connectors. In this way one of the connecting lugs of the temperature monitor can be directly joined, without the insertion of an electrical lead, to the flat connector. The accommodating recess is advantageously essentially rectangular with two longitudinal edges and a front edge, and the clear width between the longitudinal edges engaging in the insertion channels of the temperature monitor is chosen so that the temperature monitor is held in a clamp-like manner. It is thereby ensured that the temperature monitor cannot unintentionally slide out from its position during the installation work.

The invention is described by way of an embodiment and with the aid of the drawings, in which.

Figure 1:
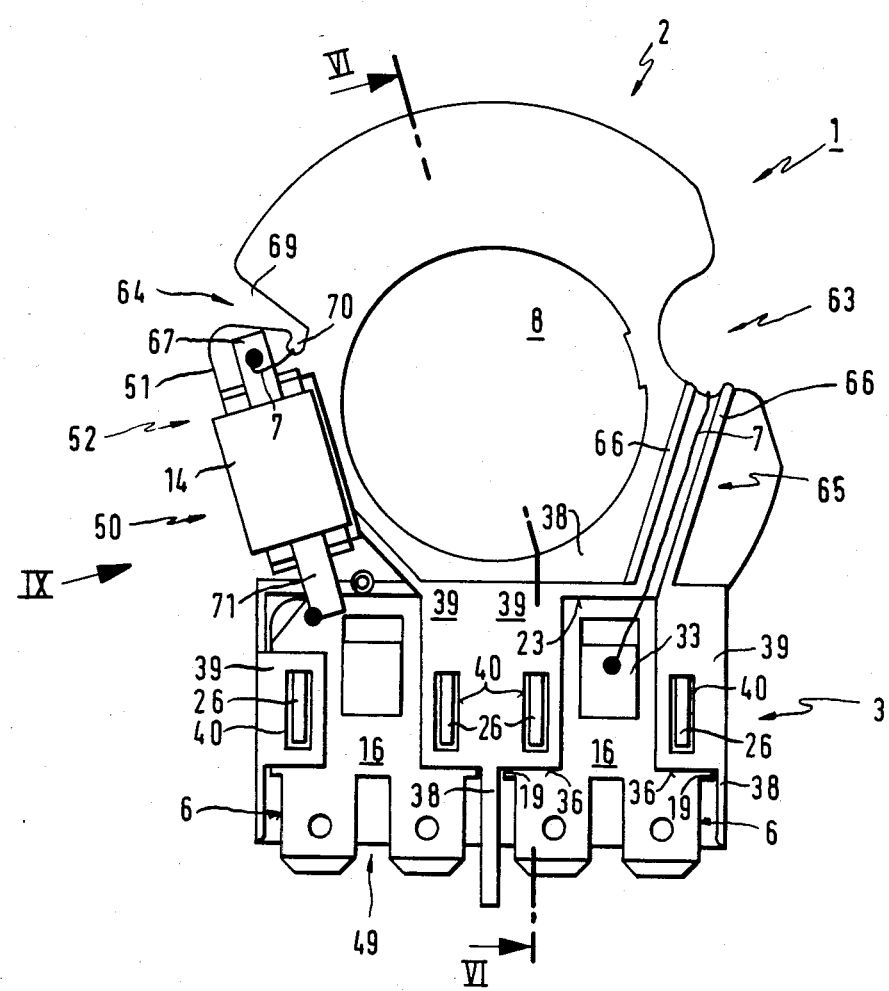
FIG. 1 is a plan view of the arrangement according to the invention, with the inserted temperature monitor.
Figure 2:
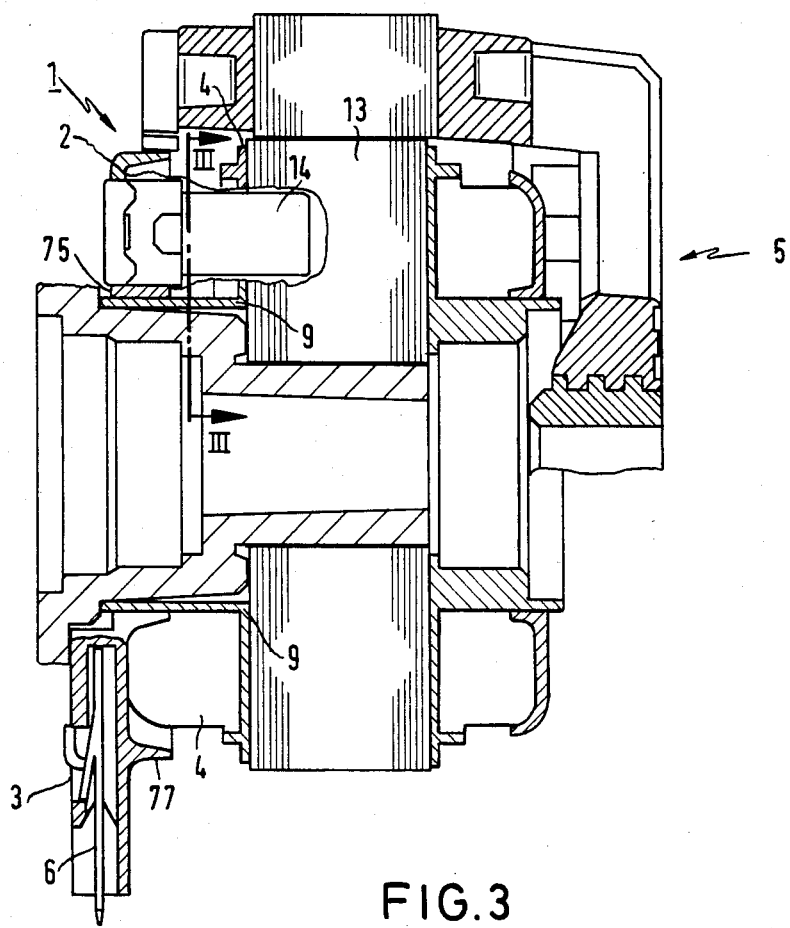
FIG. 2 is a sectional view of an external rotor motor with an insulating disc according to the invention mounted on the front insulation shaft.

According to FIG. 1 the arrangement according to the invention for joining the cable ends of a stator winding of an electric motor comprises an insulating disc 1 consisting of a cover region 2 and a receiving region 3. It is clear from FIG. 2 that the cover region 2 is used to cover as well as insulate and/or protect a winding head 4 of a stator winding of an external rotor motor 5. The receiving region 3 serves to hold connecting elements 6, by means of which a connecting lead (not shown) is joined to the cable ends 7 of the winding head 4. The insulating disc 1 has an opening 8 passing from the front insulating shaft 9 of the stator plates 13 of the external rotor motor 5. The insulating disc 1, which is preferably made out of Ultramid for price reasons, can be secured by a press fit, adhesion, ultra-sonic welding, or the like to the front insulating shaft 9.

Figure 3:
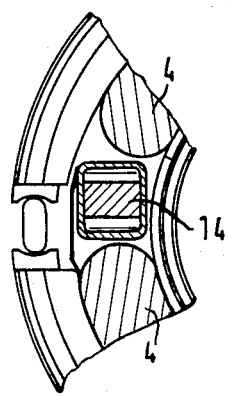
FIG. 3 is a sectional view in the region of the temperature monitor along the line III—III according to FIG. 2.

According to FIG. 1, two connecting elements 6 are arranged next to one another in the receiving region 3 of the insulating disc 1. For this purpose the receiving region 3 has a substantially rectangular shape. The external contour of the cover region 2 runs parallel in sections to the opening 8. A temperature monitor 14 is arranged adjacent to the receiving region 3 in the cover region 2, and serves to protect the stator winding of the external rotor motor 5. The temperature monitor 14 is joined at one end of a winding end of the stator winding and at the other end to the connecting lead, so that it is connected in series with the stator winding. It can be seen from FIGS. 2 and 3 that the temperature monitor 14 extends axially in the direction of the winding head 4, with which it is in intimate contact.

Figure 4:
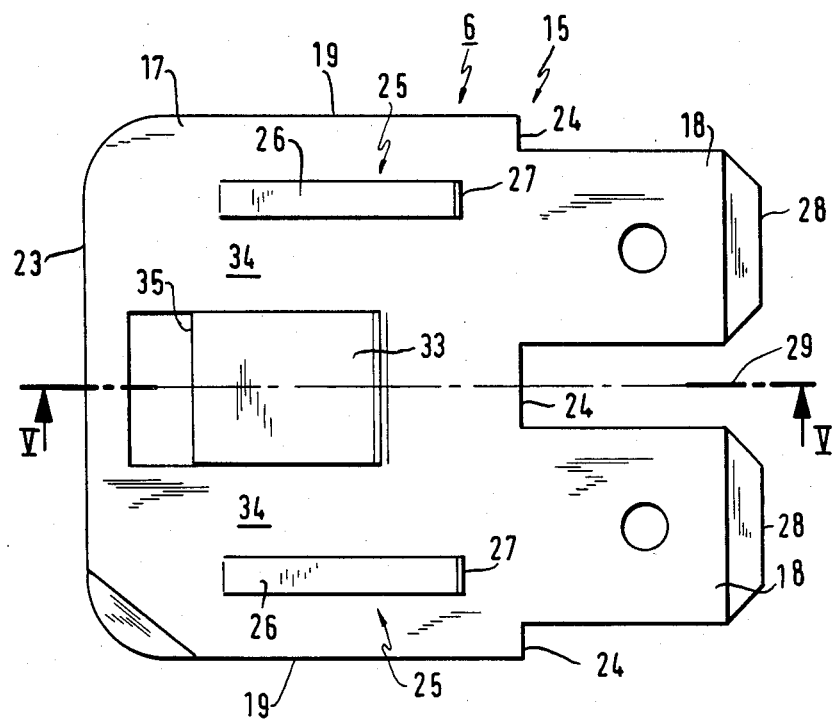
FIG. 4 is a plan view of a flat connector according to the invention.
Figure 5:
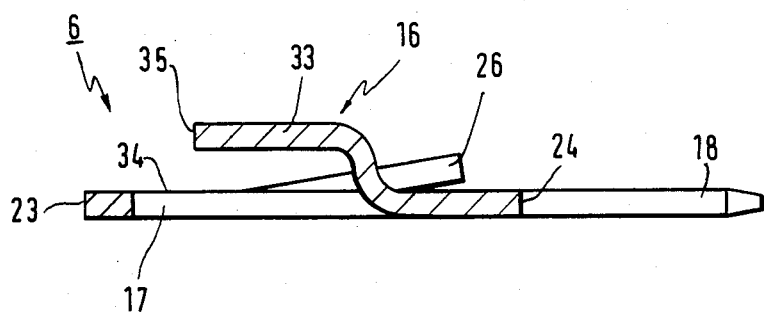
FIG. 5 is a sectional view of the flat connector along the line V—V according to FIG. 4.

The connecting element 6 is designed as a stamped-out sheet metal part and, according to FIGS. 4 and 5, is formed as a connector 15, preferably a flat connector 16. The flat connector 16 has an essentially rectangular base part 17 and two connecting lugs 18 joined integrally thereto for correspondingly formed jacks (not illustrated) of the connecting lead. The rectangular base part 17 has two side edges 19 as well as a head edge 23 and a foot edge 24. The connecting lugs 18 are integrally joined to the foot edge 24. A catch means 25 formed as a catch tongue 26 is stamped out from the base part 17, in each case in the vicinity of the side edge 19, and is bent so as to form an angle. Each catch tongue 26 runs parallel to the side edges 19 and has a free end 27, which according to FIG. 4 points in the same direction as the free ends 28 of the connecting lugs 18. A connecting plate 33 is stamped out centrally with respect to the mid axis from the base part 17 and is bent upwardly in such a way that it runs substantially parallel to the remaining surface 34 of the base part 17 surrounding the connecting plate 33. The free end 35 of the connecting plate 33 points in the opposite direction to the free ends 28 of the connecting lugs 18.

Figure 6:
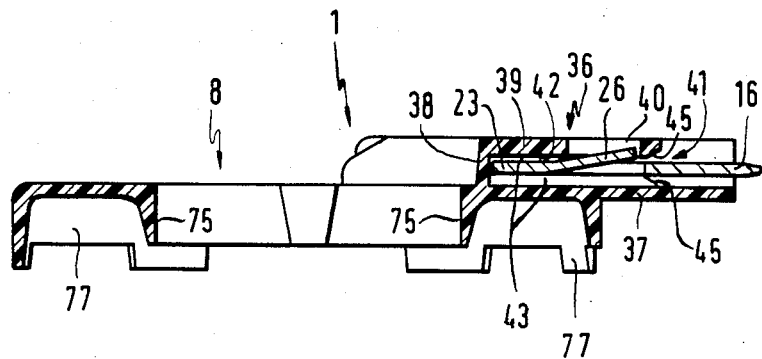
FIG. 6 is a sectional view along the line VI—VI according to FIG. 1.

It can be seen in particular from FIGS. 1 and 6 that the flat connectors 16 are inserted in receiving pockets 36 of the insulating disc 1. Each receiving pocket 36 is formed from a section 37 of the insulating disc 1 as well as from wall webs 38 standing vertically with respect to the insulating disc 1 and bordering the side edges 19 and the head edge 23 of the base part 17 of the flat connector 16, and from retaining walls 39 running parallel to the insulating disc 1, partially overlapping the flat connector 16, and joining on to the wall webs 38. The flat connector 16 is thus accommodated between the section 37 of the insulating disc 1 and the retaining walls 39. The wall webs 38 bordering the side edges 19 of the flat connector 16 serve for the lateral guidance of the flat connector and the wall web 38 bordering the head edge 23 forms a bottom wall of the receiving pocket 36. Rectangular recesses 40 are arranged in the retaining walls 39, which lie opposite the catch tongues 26 when the flat connector 16 is inserted into the receiving pocket 36, wherein the dimensions of the recesses 40 are suitably adapted to the dimensions of the catch tongues 26. In the interior 41 of each receiving pocket 36 clamping webs 43 running in the direction of the connecting lugs 18 of the flat connectors 16 are formed both on the section 37 of the insulating disc 1 and on the inner faces 42 of the retaining walls 39. Four such clamping webs 43 are present on the section 37 and four clamping webs 43 are likewise located on the retaining walls 39 of a receiving pocket 36. The arrangement of the clamping webs 43 can best be seen from FIGS. 6 and 7, wherein in FIG. 7 no flat connector 16 is shown inserted in the right-hand receiving pocket 36, so that the view of the clamping webs 43 is not obscured. By means of the clamping webs 43 on the section 37 and on the retaining walls 39, between which the flat connector 16 is arranged in a lightly clamped manner or with a slight degree of play, the flat connectors 16 are held centrally in the receiving pocket 36 and equidistant from the insulating disc 1 and the retaining walls 39. Each clamping web 43 runs in the insertion direction of the connecting lugs 18 and has a bevelled surface 45 at the entrance 44 of the receiving pocket 36. The bevelled surfaces 45 of the clamping webs 43 of each receiving pocket 36 form a locating socket which facilitates the introduction of the connectors 16 into the receiving pocket 36.

Figure 8:
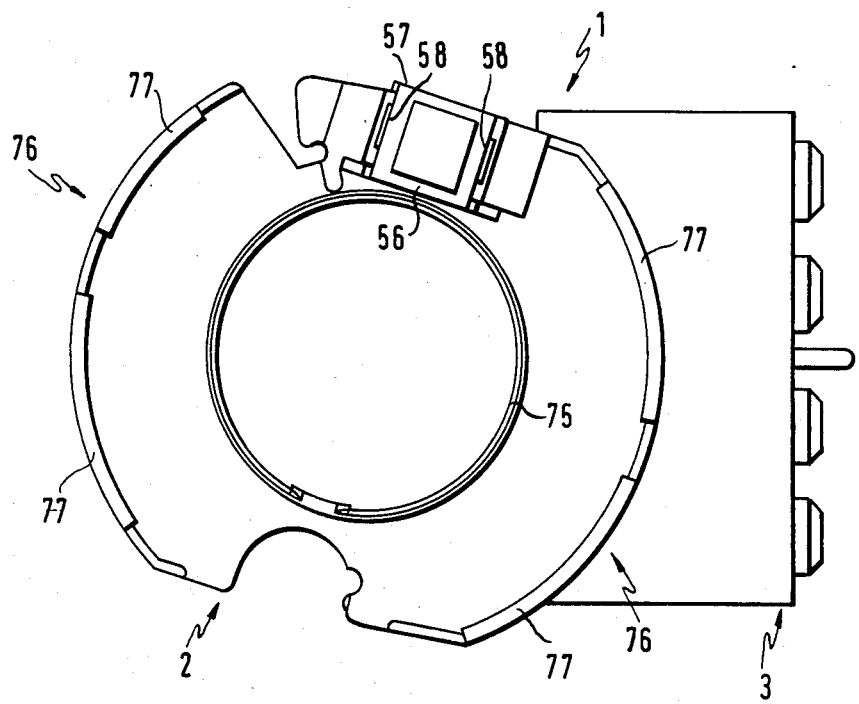
FIG. 8 is a rear view of the arrangement in accordance with the invention, according to FIG. 1.
Figure 9:
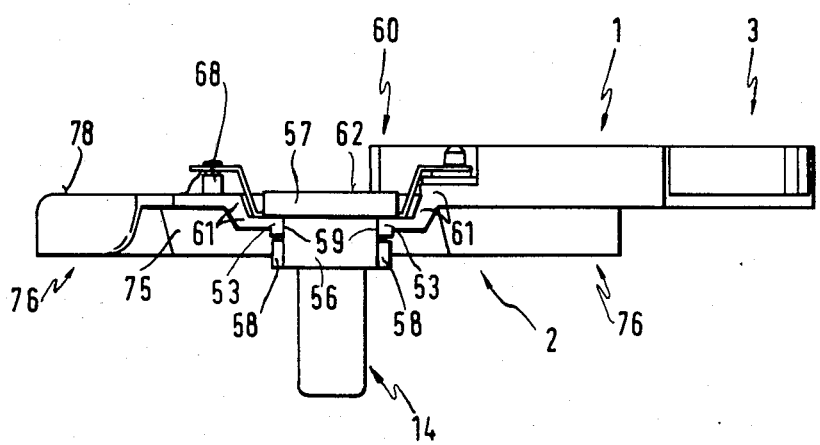
FIG. 9 is a side view of the arrangement according to the invention in the direction of the arrow IX according to FIG. 1.

In order to retain the flat connectors 16 on the insulating disc 1 the connectors are inserted in the direction of the arrow 49 (FIG. 1) into the corresponding receiving pocket 36 until the catch tongues 26 engage in the corresponding recesses 40 and the head edge 23 of the base part 17 lies against the appropriate wall web 38. If it is intended to provide a temperature monitor 14 in order to protect the stator winding of the external rotor motor 5, then this monitor is inserted laterally in the direction of the arrow 50 (FIG. 1) into a substantially rectangular, unilaterally open accommodating recess 52 bordering the edge 51 of the insulating disc 1. The accommodating recess 52 has, according to FIG. 7, two longitudinal edges 53 and a front edge 54. Small retaining protuberances 55 are formed on the longitudinal edges 53, which clasp the shaft 56 of the temperature monitor 14 and thereby secure the latter. In addition, the clear width between the longitudinal edges 53 can be chosen so that the temperature monitor 14 is retained in a clamping manner in the accommodating recess 52. FIGS. 8 and 9 show that the temperature monitor 14 has a head 57 projecting laterally beyond the shaft 56, and projections 58 in the upper shaft region, so that insertion channels 59 are formed between the head 57 and the projections 58 in which the longitudinal edges 53 of the accommodating recess 52 engage. The insulating disc 1 runs in the temperature monitor/receiving region 60 according to FIG. 9 by means of two downwardly pointing parallel bent sections 61, so that the head face 62 of the head 57 runs in the same plane as the other surface 63 of the insulating disc 1.

In FIG. 1 the joining of the cable ends 7 of the stator winding of the external rotor motor 5 is illustrated with the insertion of a temperature monitor 14. The cable ends 7 are run up to the insulating disc 1 on the cable run-ins 63 and 64. The cable end 7 arriving at the cable run-in 63 is led thence in an upwardly open cable guide duct 65 up to the flat connector 16, where it is soldered or welded to the connecting plate 33. The cable guide duct 65 is formed from two ribs 66 running parallel to one another and standing vertically relative to the insulating disc 1. The cable guide duct 65 ensures that the cable end 7 does not come into contact with the shaft or parts of the bearing or bearing pipe, which could damage the insulation. The other cable end 7, introduced at the cable run-in 64, is directly guided to the connection 67 of the temperature monitor 14, where it is soldered or welded. In order to have a reliable support for the connection 67 of the temperature monitor 14 during the soldering or welding process, according to FIG. 9 a peg 68 connected integrally to the insulating disc 1 is provided as a base. In order to retain the cable end 7 securely in the cable run-in 64, the cable run-in 64 formed as a notch or recess 69 has a roughly right-angled end region 70 in the region of its base, in which the cable end 7 is securely guided. The other connection 71 of the temperature monitor 14 is directly connected to the associated flat connector 16 by soldering or welding. In this connection, the welding-on can either take place on the connecting plate 33 or, as illustrated in FIG. 1, on the base part 17 adjacent to the connecting plate 33.

Figure 7:
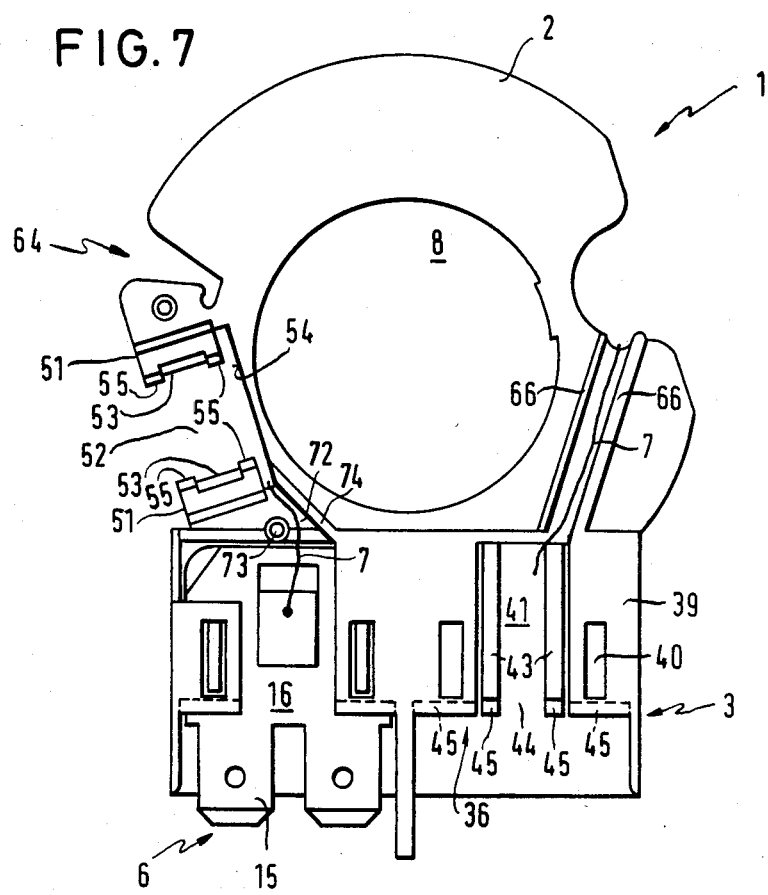
FIG. 7 is a plan view of the arrangement according to the invention without the use of a temperataure monitor.

FIG. 7 illustrates the connection of a cable end 7 to the flat connector 16 without using a temperature monitor 14. In this connection the left-hand cable end 7 in FIG. 7 is introduced not at the cable run-in 64, but is introduced into the accommodating recess 52. From here the cable is guided to the flat connector 16 through an intermediate space 72 formed between a guide peg 73 and a cable guide web 74. These parts serve to prevent the cable end 7 coming into contact with metal bearing parts.

It is clear from FIGS. 8 and 9 that edge walls 75 and 76 are formed on the insulating disc 1, and stand vertically with respect thereto. The edge wall 75 concentrically surrounds the opening 8, while the edge wall 76 consists of sections 77 bordering the periphery of the cover region 2. In this way the winding head 4 of the external rotor motor 5 is partially enclosed (FIG. 2), whereby the protective and insulating effect is increased.

An essential inventive feature is the fact that the insulating disc 1 has on one side the receiving pockets 36 for the flat connectors 16, the section 37 of the insulating disc 1 forming a wall of the receiving pockets 36. On the other side a part of the section 37 of the insulating disc 1 also serves to cover the winding head 4 of the electric motor, so that from this partial overlapping of the receiving region 3 and cover region 2 there results a slight overall length of the insulating disc 1 including the receiving pockets 36.

I claim:

1. In apparatus for joining the cable ends of a stator winding of electric motors, in particular external rotor motors, with a connecting lead using electrical connecting elements and an insulating disc arranged at one end of the stator, which disc has an opening extending from the front insulating shaft of the stator plates of the electric motor and serves to cover as well as insulate the coil winding head of the stator winding, the improvement comprising:

said connecting elements being formed as connectors, and each connector being retained on the insulating disc, said connectors being flat and formed from stamped-out sheet metal parts;

said insulating disc having receiving pockets defining recesses and configured to receive and retain said connecting elements;

each said connecting element including a catch means operative to retain the connecting element in said receiving pocket; and said catch means comprising catch tongues stamped out from said sheet metal parts and bent at an acute angle so as to engage in corresponding said recesses of said pockets, so as to retain said connecting elements engaged in said pockets.

2. Arrangement according to claim 1, characterised in that each flat connector (16) consists essentially of a rectangular base part (17) with two side edges (19) as well as a head edge (23) and a foot edge (24), that a connecting lug (18) for a corresponding jack of the connecting lead integrally joins onto the foot edge (24), and that the catch tongue (26) is formed in the region of the base part (17) and has a free end (27) which runs in the opposite direction to the insertion direction of the flat connector (16) in the receiving pocket (36).

3. Arrangement according to claim 2, characterised in that the flat connector (16) has two catch tongues (26).

4. Arrangement according to claim 3, characterised in that one of the catch tongues (26) is arranged in the vicinity of each side edge (19) of the base part (17).

5. Arrangement according to claim 2, characterised in that two connecting lugs (18) running parallel to and spaced apart from one another are joined integrally onto the foot edge (24) of the base part (17).

6. Arrangement according to claim 2, characterised in that a connecting plate (33) for the stator winding is stamped out from the base part (17) and is bent upwardly in such a way that it projects beyond the remaining surface (34) of the base part (17).

7. Arrangement according to claim 6, characterised in that the connecting plate (33) runs substantially parallel to the remaining surface (34) of the base part (17) surrounding the connecting plate (33).

8. Arrangement according to claim 1, characterised in that the insulating disc has a cover region (2) for the winding head (4) of the electric motor and a receiving regin (3) for the receiving pockets (36).

9. Arrangement according to claim 8, characterised in that two receiving pockets (36) lying parallel to one another are arranged in the receiving region (3) of the insulating disc (1).

10. Arrangement according to claim 9, characterised in that each receiving pocket (36) is formed from a section (37) of the insulating disc (1) as well as from wall webs (38) arranged vertically with respect to the insulating disc (1) and bordering the side edges (19) and the head edge (23) of the base part (17), and from retaining walls (39) running parallel to the insulating disc (1), partially overlapping the flat connector (16), and joining onto the wall webs (38).

11. Arrangement according to claim 10, characterised in that the retaining walls (39) grip the flat connectors (16) at least in the region of the catch tongues (26) and have recesses (40) for the catch tongues (26).

12. Arrangement according to claim 10, characterised in that in the interior (41) of the receiving pocket (36) clamping webs (43) are formed both on the insulating disc (1) and on the inner faces (42) of the retaining walls (39), against which webs the flat connector (16) lies in such a way that it is arranged centrally in the receiving pocket (36) and spaced apart from the insulating disc (1) and the retaining walls (39).

13. Arrangement according to claim 12, characterised in that the clamping webs (43) run in the insertion direction of the connecting lugs (18) and have at the entrance (44) of each receiving pocket (36) in each case a bevelled edge (45) forming a locating socket for the flat connectors (16).

14. Arrangement according to claim 13, characterised in that a cable end (7) of the stator winding of the electric motor is connected to the connecting lead under series connection with a temperature monitor (14) by means of the connectors (15) held on the insulating disc (1).

15. Arrangement according to claim 14, characterised in that the insulating disc (1) has a unilaterally open accommodating recess (52) bordering its edge (51), for the lateral insertion of the temperature monitor (14).

16. Arrangement according to claim 15, characterised in that the accommodating recess (52) is formed in the cover region (2) of the insulating disc (1) close to the receiving region (3) for the flat connectors (16).

17. Arrangement according to claim 15, characterised in that the accommodating recess (52) is essentially rectangular with two longitudinal edges (53) and one front edge (54), and that the clear width between the longitudinal edges (53) engaging in insertion channels (59) of the temperature monitor (14) is chosen so that the temperature monitor (14) is held in a clamping manner.

18. In apparatus for joining the cable ends of a stator winding of an electric external rotor motor with a connecting lead using electrical connecting elements and an insulating disc arranged at one end of the stator, the disc having insulating through which the front insulating shaft of the stator plates of the external rotor motor extends, the disc serving to cover as well as insulate the coil end of the stator winding, and the disc having a cover region for the coil end and receiving pockets for the incorporation of the electrical connecting elements, the improvement comprising:

said receiving pockets (36) being disposed on one side of the insulating disc (1) in a receiving region (3) having retaining walls (39) being parallel to the insulating disc (1);

said connecting elements (6) being formed as plug connectors; and one part of each said plug connector (15) comprises means retainingly engaging the receiving pockets (36) in a manner holding the plug connectors in the receiving pockets.

* * * * *